United States Patent [19]

Zuback

[11] Patent Number: 5,061,378
[45] Date of Patent: Oct. 29, 1991

[54] SLUDGE TRANSFER SYSTEMS AND METHODS

[75] Inventor: Joseph E. Zuback, Camarillo, Calif.
[73] Assignee: Infilco Degremont Inc., Richmond, Va.
[21] Appl. No.: 619,500
[22] Filed: Nov. 29, 1990
[51] Int. Cl.⁵ ............................................. B01D 47/02
[52] U.S. Cl. ................................. 210/767; 210/198.1; 210/205; 210/220; 210/221.2; 210/221.1; 261/77; 137/205; 137/572; 137/575
[58] Field of Search ............ 210/623, 624, 767, 198.1, 210/205, 220, 221.1, 221.2; 261/77; 137/205, 572, 575

[56] References Cited

U.S. PATENT DOCUMENTS

| | | | |
|---|---|---|---|
| 3,396,102 | 8/1968 | Forrest | 210/221.1 |
| 4,582,599 | 4/1986 | Repin et al. | 210/205 |
| 4,710,290 | 12/1987 | Briltz | 210/205 |
| 4,931,175 | 6/1990 | Krofta | 210/221.2 |

Primary Examiner—W. Gary Jones
Assistant Examiner—David Reifsnyder
Attorney, Agent, or Firm—Carroll F. Palmer

[57] ABSTRACT

Known water or wastewater treatment methods, wherein a layer of fluid sludge is formed during operation of the method in a first chamber beneath a body of liquid partially filling the first chamber to an upper liquid level, fluid sludge from the first chamber is processed in a second chamber and a stream of fluid sludge is conveyed by a conduit from the first chamber as influent to the second chamber, are improved by creating upward flow of fluid sludge through a vertical stackpipe by introducing large bubbles within the stackpipe with its inlet end immersed in the layer of fluid sludge, discharging fluid sludge through an elongated, longitudinal side opening in the top portion of the stackpipe into a collector zone at least a portion of which is at a vertical height above the upper liquid level, controlling the rate of the discharge of fluid sludge by vertical adjustment of the position of the side opening relative to the upper liquid level in the first chamber and flowing fluid sludge from the collector zone into the conduit for conveyance as the influent to the second chamber. Apparatus to accomplish the new methods is disclosed.

5 Claims, 1 Drawing Sheet

SLUDGE TRANSFER SYSTEMS AND METHODS

BACKGROUND OF THE INVENTION

1. Field of the Invention

This application relates to water and wastewater treatment operations. More particularly, it concerns improved systems and methods for the handling and transfer of sludge generated in water and wastewater treatment operations.

2. Description of the Prior Art

Large quantities of sludge are created daily in the treatment of water and wastewater. Accordingly, a constant problem exists in the handling and utilization and/or disposal of such sludge. By way of example of the problem, reference is made to a water clarifier system marketed by the assignee of this invention under the trademark DensaDeg ® in which settled solids (sludge) must be transferred from a clarifier back into an upstream reactor. The DensaDeg ® systems are disclosed in an Infilco Degremont Inc. brochure DB-555 entitled *DensaDeg ® High Rate Clarifier and Thickener*, dated March 1990, the contents of which are incorporated herein by reference.

In the operation of the DensaDeg ® systems, substantially large quantities of fluid sludge must be recycled for chemical reactions to go to completion. Typically, such recycle transfer is accomplished by the use of external, mechanical pumps. Other water or wastewater treatment operations exist in which solids collected as stratified entities must be transferred from one chamber to another, e.g., biological treatment systems wherein biological floc is recycled back from a clarifier to a biological contractor (activated sludge treatment). Hence, the term sludge as used in this disclosure and the accompanying claims is intended to cover not only water treatment sludge per se, but equivalent fluid solid material stratified layers that are transferred from one chamber to another in water and wastewater treatment operations.

The present invention provides unique arrangements and methods for meeting these sludge transfer requirements while greatly reducing the cost of the previously know equipment and energy demands.

OBJECTS

A principal object of the invention is the provision of improvements in sludge transfer systems and methods associated with water and wastewater treatment operations.

Further objects include the provision of:

1. Improvements in sludge transfer systems that substantially reduce the cost of component parts thereof.

2. Improvements in sludge transfer methods that substantially reduce the amount of energy required for carrying out such methods.

3. Improvements in sludge transfer systems that mitigate upkeep and repair costs and render them more reliable in operation.

4. Improvements in sludge transfer methods that make it easier to monitor their operation.

5. Improvements in sludge transfer systems that minimize the number of moving equipment components thereof.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of improvements in sludge transfer systems that include a first chamber in which a layer of fluid sludge is formed in the base thereof during operation of the system, a second chamber in which an influent of sludge from the first chamber is processed and conduit means for conveying a stream of fluid sludge that connects the first chamber with the second chamber to convey a stream of the fluid sludge from the first chamber to the second chamber.

The improvements of the invention, in part, comprise providing sludge transfer means within the first chamber which includes a stackpipe extending vertically from an inlet at the lower end thereof to an outlet at the upper end thereof and large bubble generator means for generating an upward flow of fluid sludge in the stackpipe when the lower end is immersed in the layer of fluid sludge.

The top of the stackpipe is closed and the outlet therein is defined by at least one longitudinal opening in the side of the stackpipe that extends from adjacent the top downwards along the stackpipe a length $\Delta$. Such longitudinal opening may be a continuous slot or a row of holes.

An elongated, tubular sleeve including a top end of length at least D slidably embraces the upper end of the stackpipe and means is associated with the upper end of the stackpipe for vertically raising and lowering it within the sleeve between a low position wherein its longitudinal opening is completely covered by the sleeve to a high position wherein a substantial portion of the longitudinal opening extends above the top of the sleeve.

The bubble generator means is connected to a source of pressurized air to create the required large bubbles by a tubular conduit, a portion of which is flexible to assist the bubble generator means to raise and lower along with the stackpipe.

A collector box is included to receive fluid sludge that issues from the upper end of the stackpipe. Such box is defined by sidewalls and a bottom through which the sleeve extends a distance such that its top end is below the vertical height of the box sidewalls.

A tubular conduit or like means connects the collector box to the conduit means to enable fluid sludge received in the box to enter the conduit means and be conveyed as influent to the second chamber.

The invention also includes improvements in sludge transfer methods wherein a layer of fluid sludge is formed during operation of the method in the base of a first chamber beneath a body of liquid partially filling the first chamber to an upper liquid level. Fluid sludge from the first chamber is processed in a second chamber and a stream of the fluid sludge is conveyed by conduit means from the first chamber as influent to the second chamber.

The method improvements of the invention comprise creating an upward flow of fluid sludge from the layer thereof through a vertical stackpipe having a top portion, a base portion and a bottom inlet end by introducing large bubbles within the stackpipe base portion while the inlet end is immersed in the layer of fluid sludge. The upward flow of fluid sludge is discharged through an elongated, longitudinal side opening in the top portion of the stackpipe into a collector zone at least a portion of which is at a vertical height above the upper liquid level. The rate of the discharge of fluid sludge through the side opening is controlled by vertical adjustment of the position of the side opening relative to the upper liquid level existing in the first chamber.

As a another step in the new methods, fluid sludge from the collector zone is caused to flow into the conduit means for conveyance as influent to the second chamber.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
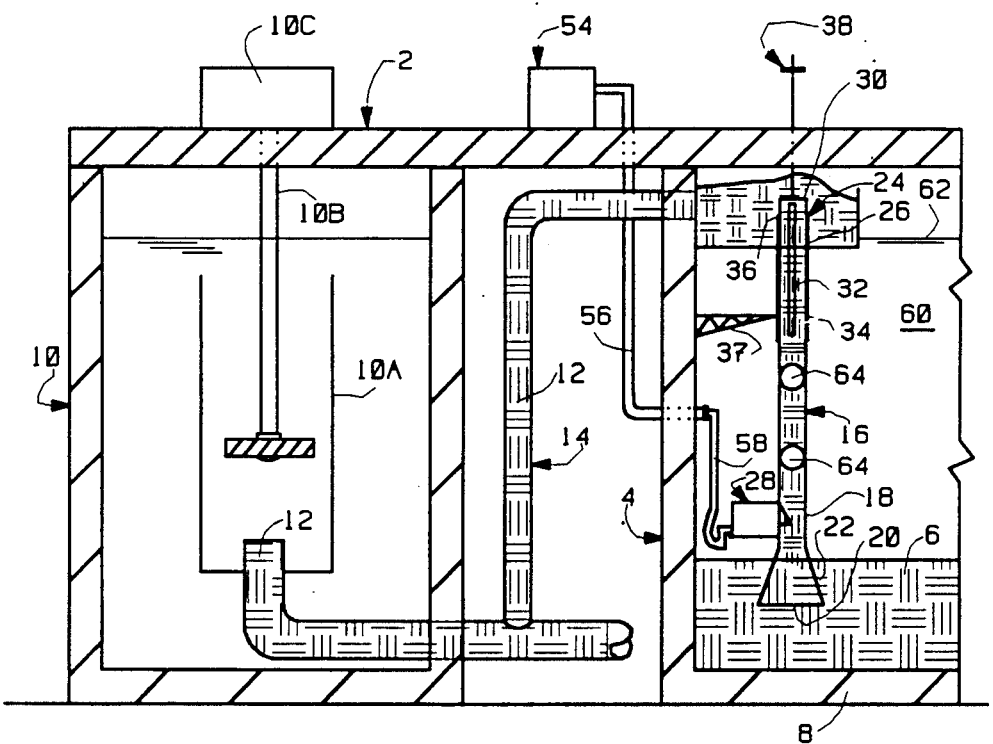
FIG. 1 is a diagrammatic lateral view, partially in section, of water treatment equipment improved by the inclusion of a sludge transfer system in accordance with the invention.
Figure 2:
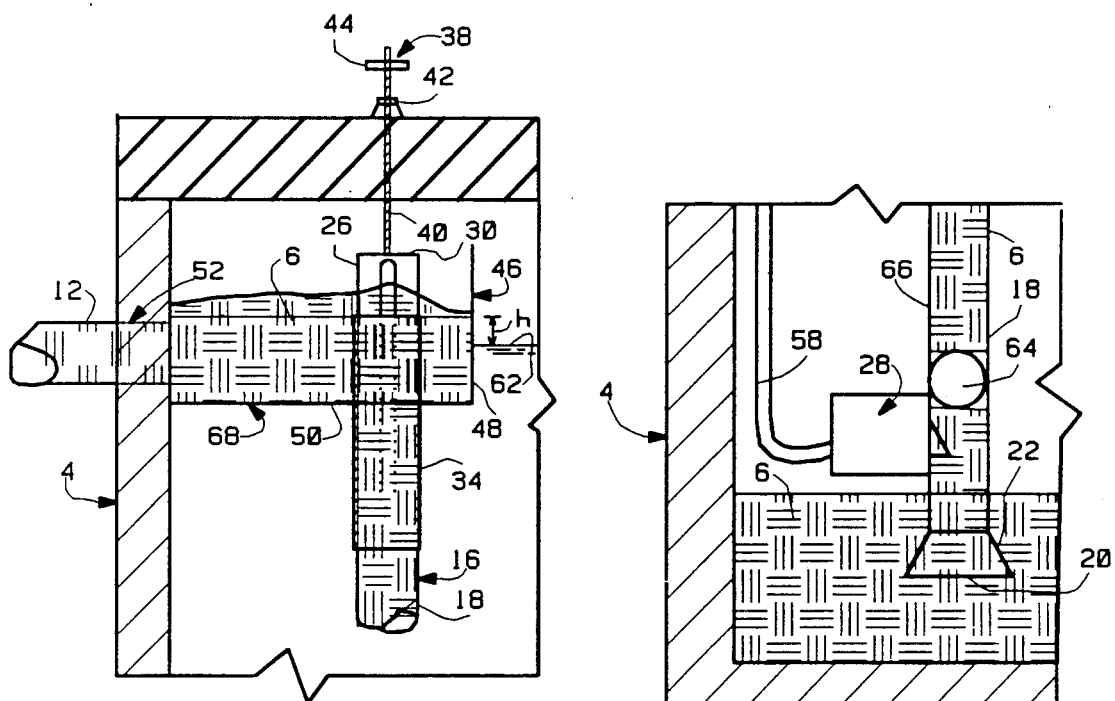
FIG. 2 is an enlarged fragmentary lateral view of one portion of the system shown in FIG. 1.
Figure 3:
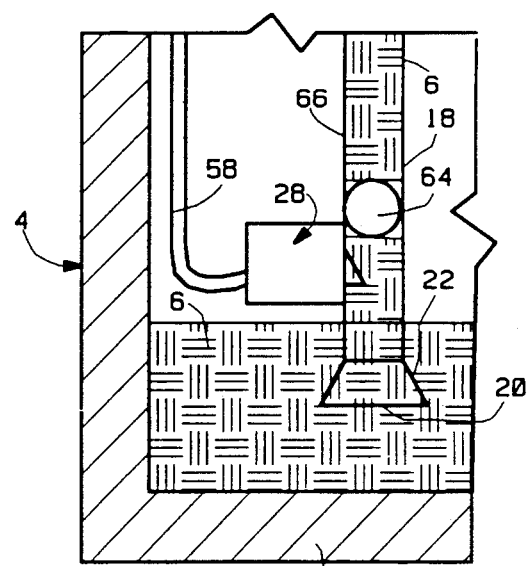
FIG. 3 is an enlarged fragmentary lateral view of another portion of the system shown in FIG. 1.

Referring in detail to the drawings in which identical parts bear the same identity numeral, the water treatment system 2 includes a first chamber 4 in which a layer of fluid sludge 6 is formed on the base 8 thereof during operation of the system 2.

There is a second chamber 10 in which an influent of sludge 12 from the first chamber 4 is processed and conduit means 14 for conveying the stream 12 of fluid sludge from the first chamber 4 to the second chamber 10. The second chamber 10 may have associated with it various items such as inner chamber 10A, agitator means 10B and drive motor 10C. These ancillary items are conventional in the prior art and do not form a critical part of the devices of the invention.

Sludge transfer means 16 within the first chamber 4 comprises a stackpipe 18 that extends vertically from the inlet 20 at the lower end 22 to an outlet 24 at the upper end 26.

Large bubble generator means 28 generates an upward flow of fluid sludge in the stackpipe 18 when its lower end 22 is immersed in the layer of fluid sludge 6. The bubble generator means 28 and the related stackpipe may take a variety of forms as disclosed in U.S. Pat. Nos. 4,187,263; 4,293,506; 4,356,131 and 4,569,804, the disclosures of which are incorporated herein by reference.

The top 30 of stackpipe 18 is closed and the outlet 24 is defined by at least one longitudinal opening 32 in the side of the stackpipe 18 that extends from adjacent the top 30 downwards along the stackpipe 18 with a length Δ. The longitudinal opening 32 may be a continuous slot as show in the drawings or a row of holes (not shown).

An elongated, tubular sleeve 34 of length at least D, which includes top end 36, slidably embraces the upper end 26 of the stackpipe 18. The sleeve 34 may be held in position by brace member 37 or any other support arrangement.

Means 38 is associated with the upper end 26 of the stackpipe 18 for vertically raising and lowering it within the sleeve 34 between a low position (not shown) wherein the longitudinal opening 32 is completely covered by the sleeve 34 to a high position wherein a substantial portion of the longitudinal opening extends above the top of the sleeve. In one preferred embodiment of the invention, the means 38 includes a threaded rod 40, threaded bearing 42 and handwheel 44. The means 38 may take a variety of different forms (not shown), e.g., an unthreaded rod similar to rod 40 and a hydraulic cylinder as replacement for threaded bearing 42 and the handwheel 44.

A collector box 46 which receives fluid sludge 6 that issues from the upper end of the stackpipe 18 includes sidewalls 48 and bottom 50 through which the sleeve 34 extends a distance such that its top end 36 is below the vertical height of the sidewalls 48.

Means 52 connects the collector box 46 to the conduit means 14 to enable fluid sludge 6 received in the box 46 to enter the conduit means 14 and be conveyed as influent to the second chamber 10.

The bubble generator means 28 is connected to a source of pressurized air 54 by a tubular conduit 56, a portion 58 of which is flexible to allow the bubble generator means 28 to raise and lower along with the stackpipe 18. The source 54 may be a motor driven compressor (not shown), the slipstream discharge from a vacuum pump (not shown) present as another part of the system 2 or any other equivalent source of pressurized air.

In a typical sludge treatment method using both prior known treatment systems, as well as those of the invention, a layer of fluid sludge 6 is formed during operation of the method on the base 8 of a first chamber 4 beneath a body of liquid 60 partially filling chamber 4 to an upper liquid level 62, fluid sludge 6 from chamber 4 is processed in a second chamber 10 and a stream of the fluid sludge 6 is conveyed by conduit means 14 from chamber 4 as influent 12 into chamber 10.

The invention provides improvements over known operations as just recited which comprise creating an upward flow of fluid sludge 6 through the vertical stackpipe 18 by introducing large bubbles 62 within the stackpipe base portion 64 while the inlet end 22 is immersed in the layer of fluid sludge 6 and discharging fluid sludge 6 through elongated, longitudinal side opening 32 in the top portion 26 of the stackpipe 18 into collector zone 66 at least a portion of which is at a vertical height h above the upper liquid level 62.

As other steps in the new methods, the rate of the discharge of fluid sludge 6 from the stackpipe 18 is controlled by vertical adjustment of the position of the side opening 32 in stackpipe 10 relative to the upper liquid level 62 and fluid sludge 6 from the collector zone 66 is flowed into the conduit means 14 as the influent 12 to second chamber 10.

The embodiments of the invention in which an exclusive property or privilege is claimed are defined as follows:

1. In a water or wastewater treatment system including a first chamber in which a layer of fluid sludge is formed during operation of said system, a second chamber in which an influent of sludge from said first chamber is processed and conduit means for conveying a stream of fluid sludge connects said first chamber with said second chamber to convey a stream of said influent from said first chamber to said second chamber, the improvement which comprises:

sludge transfer means within said first chamber comprising a stackpipe extending vertically from an inlet at the lower end thereof to an outlet at the upper end thereof and large bubble generator means for generating an upward flow of fluid sludge in said stackpipe when said lower end is immersed in said layer of fluid sludge, the top of said stackpipe being closed, said outlet being defined by at least one longitudinal opening in the side of said stackpipe that extends from adjacent said top downwards along said stackpipe a length D, an elongated, tubular sleeve including a top end of length at least D slidably embracing said upper end of said stackpipe, means associated with said upper end for vertically raising and lowering said stackpipe within said sleeve between a low position wherein said longitudinal opening is completely covered by said sleeve to a high position wherein a substantial portion of said longitudinal opening extends above said top of said sleeve, a collector box to receive fluid sludge that issues from said upper end of said stackpipe defined by sidewalls and a bottom through which said sleeve extends a distance such that its said top end is below the vertical height of said sidewalls, and means connecting said collector box to said conduit means to enable fluid sludge received in said box to enter said conduit means and be conveyed as influent to said second chamber.

2. The system of claim 1 wherein said longitudinal opening is a continuous slot.

3. The system of claim 1 wherein said longitudinal opening is a row of holes.

4. The system of claim 1 wherein said bubble generator means is connected to a source of pressurized air by a tubular conduit, a portion of which is flexible to assist said bubble generator means to raise and lower along with said stackpipe.

5. In a water or wastewater treatment method wherein a layer of fluid sludge is formed during operation of said method in a first chamber beneath a body of liquid partially filling said first chamber to an upper liquid level, fluid sludge from said first chamber is processed in a second chamber and a stream of said fluid sludge is conveyed by conduit means from said first chamber as influent to said second chamber, the improvement which comprises:

creating an upward flow of fluid sludge through a vertical stackpipe having a top portion, a base portion and a bottom inlet end by introducing large bubbles within said stackpipe base portion while said inlet end is immersed in said layer of fluid sludge, discharging fluid sludge through an elongated, longitudinal side opening in said top portion of said stackpipe into a collector zone at least a portion of which is at a vertical height above said upper liquid level, controlling the rate of said discharge of fluid sludge by vertical adjustment of the position of said side opening relative to said upper liquid level, and flowing fluid sludge from said collector zone into said conduit means for conveyance as said influent to said second chamber.

* * * * *